United States Patent

Westbury

[15] 3,653,226
[45] Apr. 4, 1972

[54] BI-DIRECTIONAL TORQUE LIMITERS
[72] Inventor: Roy Westbury, Bridgnorth, England
[73] Assignee: H. M. Hobson Limited, London, England
[22] Filed: June 11, 1970
[21] Appl. No.: 45,429

[52] U.S. Cl. .................................................64/29
[51] Int. Cl. ...........................................F16d 7/00
[58] Field of Search ....................64/28, 29; 184/134

[56] References Cited

UNITED STATES PATENTS

| | | | |
|---|---|---|---|
| 2,493,232 | 1/1950 | Dodge | 64/29 X |
| 3,063,263 | 11/1962 | Bobst et al. | 64/29 |
| 3,441,115 | 4/1969 | Gunther | 64/29 X |
| 3,542,162 | 11/1970 | Kerr et al. | 188/134 |

*Primary Examiner*—Edward G. Favors
*Attorney*—Martin Kirpatrick

[57] ABSTRACT

The combination, with a rotatable driving member and a cooperating rotatable driven member, of a bi-directional torque limiter which operates to limit the torque which can be transmitted from the driving to the driven member irrespective of the direction of rotation of the driving member, said torque limiter comprising a spring loaded connection between the driving and driven members which includes an element which normally partakes in the transmission of the drive but which, when the output torque reaches a predetermined limit, is arranged to move against spring action into engagement with a fixed element to relieve the driven member from the input torque.

2 Claims, 1 Drawing Figure

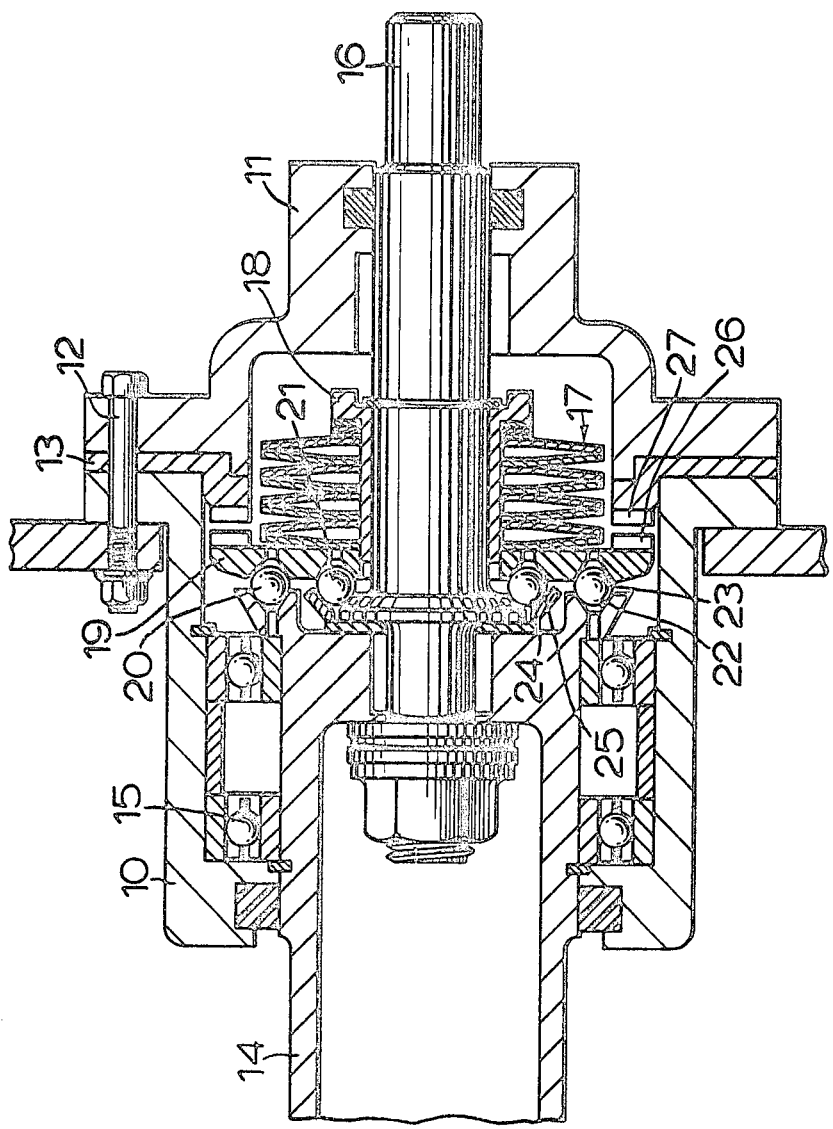

BI-DIRECTIONAL TORQUE LIMITERS

This invention provides a bi-directional torque limiter which limits the torque which may be transmitted by a rotatable driving member to a rotatable driven member when the input torque available is greater than that acceptable to the mechanism driven by the driver member. The torque limiter in accordance with the invention operates irrespective of the direction of rotation of the driving member and it is also bi-directional, i.e. it is effective when the inputs and outputs are reversed.

It comprises a spring loaded connection between the driving and driven members which includes an element which normally partakes in the transmission of the drive but which when the output torque reaches a predetermined limit, is arranged to move against spring action into engagement with a fixed element to relieve the driven member from the input torque.

One embodiment of the invention is illustrated in the accompanying drawing, which is a longitudinal section through the torque limiter.

The apparatus illustrated comprises a stationary casing, consisting of two parts 10, 11 which are fixed together by bolts 12 with an intervening stationary brake disc 13. An input shaft 14 is journalled on a bearing 15 and normally transmits rotation to a coaxial output shaft 16 through the torque limiter. This consists of a spring pack 17, mounted in compression between a sleeve 18 on the output shaft 16 and a rotary brake disc 19, and two sets of balls 20, 21 disposed on circles of different diameter. The outer balls 20 are accommodated in cups 22, 23 disposed in opposed faces of the input shaft 14 and of the brake disc 19 and the inner balls 21 are accommodated in cups 24, 25 disposed in opposed faces of the output shaft 16 and the brake disc 19. The shafts 14, 16 are held against axial movement.

So long as the torque does not exceed a predetermined limit, the drive is transmitted from the input shaft 14, via the outer set of balls 20, the disc 19 and the inner set of balls 21 to the output shaft 16 and the spring pack 17. When the output torque reaches a predetermined limit, the balls 20 will cooperate with the inclined faces of the cups 23 to move the braking disc 19 to the right against the action of the spring pack 17 until it engages the stationary braking disc 13. The members 19 and 13 are formed with teeth 26, 27 which mesh to lock the mechanism and to stall the input torque, protecting the mechanism connected to the output shaft.

During normal operation the device thus acts as a straight through drive in both directions of rotation of the input shaft and also if the drive is applied to the shaft 16 instead of the shaft 14. It will operate as the torque limiter in either direction of rotation, or from either end. The torque level at which locking occurs may be the same for both directions of rotation. However a different torque level setting may be obtained in one direction of rotation as distinct from the other direction by appropriate shaping of the ball cups 23, 25.

The torque limiter illustrated is self resetting, since after the input torque has been stalled and the reacted torque has fallen to a predetermined level the spring pack 17 will cause it to revert to a straight through drive.

Alternatively the torque limiter could be so constructed as to maintain its locked condition until the input torque is deliberately reduced or reversed.

The torque limiter according to the invention is of general utility but is specifically intended for use in aircraft flap and slat control systems for the purpose of protecting the aircraft structure from the full output torque of the actuating mechanism.

I claim:

1. The combination with a rotatable input shaft and a rotatable output shaft coaxial with the input shaft, of a bi-directional torque limiter which operates to limit the torque which can be transmitted from the input shaft to the output shaft irrespective of the direction of rotation of the input shaft, said torque limiter comprising a stationery braking member, a cooperating rotary braking disc spring urged away from the stationary braking member and two sets of balls arranged in circles of different diameter, one set of balls being accommodated in cups in the face of the braking disc remote from the stationary braking member and in cups in an opposed face on the input shaft and the other set of balls being accommodated in cups in said remote face of the braking disc and cups in an opposed face on the output shaft, said braking disc being arranged to move against spring action into engagement which said stationary braking member when the output torque attains a predetermined limit to relieve the output shaft from the input torque.

2. A combination as claimed in claim 1, in which said braking disc and said braking member are formed with teeth adapted to mesh upon engagement of the braking disc with the stationary braking member.

* * * * *